INVENTORS
JOHN KAMMERER HARDING
DAVID GURNEY ARNOLD THOMAS
BY
Irvin S. Thompson
ATTORNEY

INVENTORS
JOHN KAMMERER HARDING
DAVID GURNEY ARNOLD THOMAS
BY
ATTORNEY

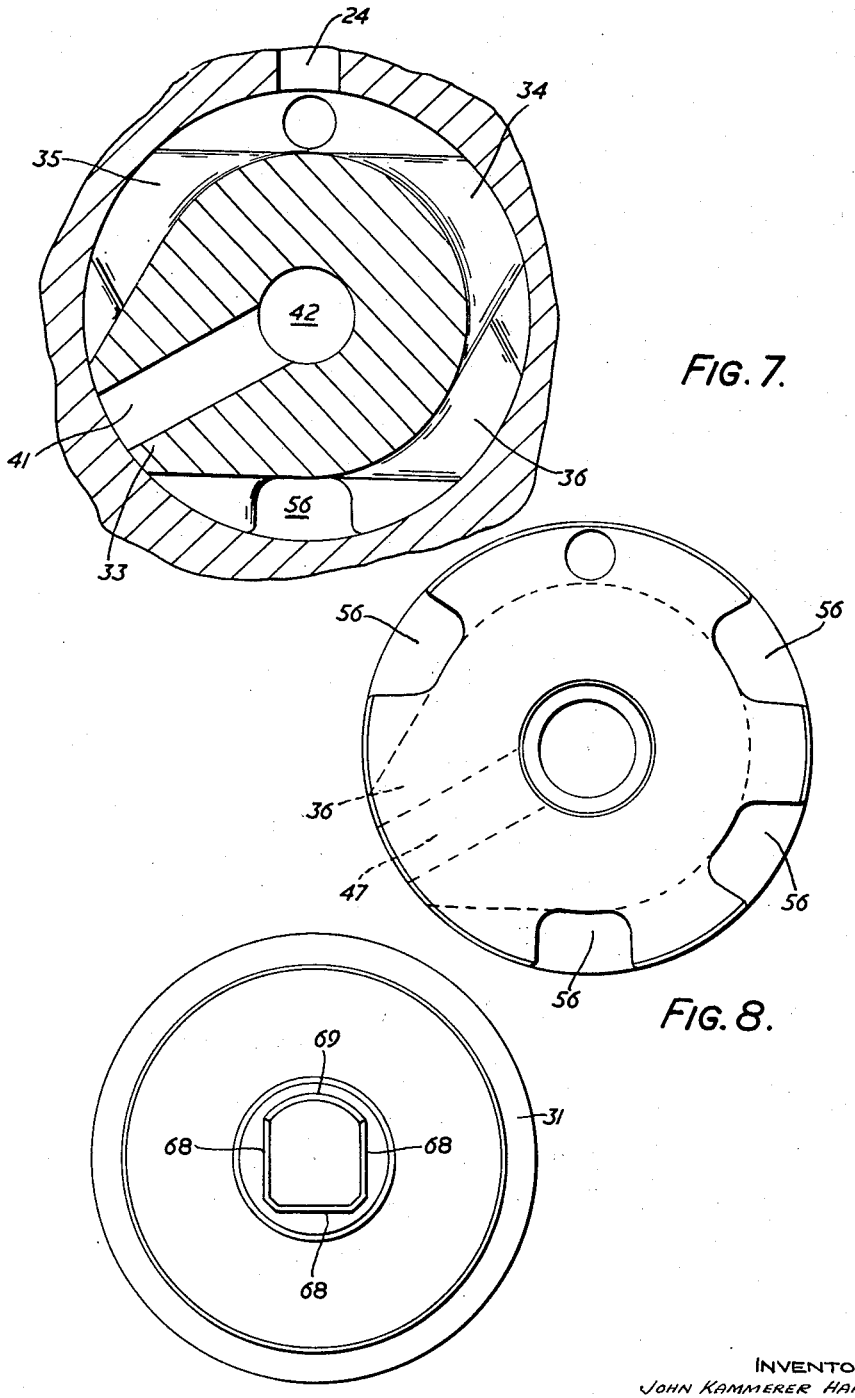

United States Patent Office 2,906,290
Patented Sept. 29, 1959

2,906,290

VALVE FOR USE WITH GASES CONTAMINATED WITH NUCLEAR FISSION PRODUCTS

John K. Harding, Charlton Kings, and David G. A. Thomas, Deerhurst Walton, England, assignors to Dowty Nucleonics Limited, Andoversford, England, a British company Application August 21, 1957, Serial No. 679,496

Claims priority, application Great Britain August 22, 1956

7 Claims. (Cl. 137—597)

This invention relates to a multi-purpose valve serving as a combined distributing and shut-off valve for use with gases contaminated with nuclear fission products. This valve is intended for use with the contamination monitoring apparatus associated with a gas cooled nuclear reactor, the purpose of the apparatus being to detect failure of any of the many uranium fuel element containers in the reactor by the contamination of the coolant gas. The fuel element containers in the reactor are located in a plurality of separate ducts, and means are provided individual to each duct whereby a faulty container may be extracted and replaced whilst the reactor is operating. To detect a failure, the gas flow through every duct must be regularly monitored to detect presense of fission products and for this purpose a system has been worked out whereby pipes carrying sample gas flows from the ducts are connectable into groups of four or other small numbers, and the gas flow from each group is monitored about once every thirty minutes for contamination. When contamination in any group is discovered a separate monitoring operation must be made on gas flow from each duct in the group to discover the duct having the faulty fuel element container. In carrying out the system a combined distributing and shut-off valve is connected to the pipes from each group of ducts and the outputs from the plurality of these valves are connected to a selector valve which selects one group at a time and passes gas flow from it to the monitoring apparatus. For brevity the term "combined distributing and shut-off valve" will be referred to in this specification as "shut-off valve." The selector valve is normally made to select each of fifty groups in succession. Thus one selector valve may deal with about two hundred ducts, but for any reactor, a considerable number of such selector valves will be necessary. A selector valve broadly comprises a large circular plate on which, for example, fifty shut-off valves are located, the group outlets from each valve leading to individual ports arranged in a circle in the plate. A large bowl is detachably fitted to the plate over the ports and includes a hollow rotating arm carrying at its outer end a spring-loaded valve which contacts the plate on the circle of ports and makes connection with one port at a time. Pressure in all pipes is the same and is communicated to the bowl so that no gas flows from any of the open ports into the bowl. The hollow rotary arm communicates with a lower pressure and thus draws off gas from each port which the valve member covers. The hollow arm is carried by a central rotary assembly and gas drawn from any port passes centrally through the plate through suitable seals to the monitoring apparatus. On the outside of the bowl an electric motor is provided having a drive shaft projecting internally of the bowl through suitable seals to drive the rotary arm. The motor moves the arm so that it selects each port in succession for a period of about thirty seconds.

The bowl is detachable for the purpose of servicing the selector valve and when the bowl is detached it is necessary that all of the shut-off valves should be capable of selecting a shut-off position where no gas from any of the pipes may pass to the associated ports in the plates.

Each shut-off valve also communicates with a single outlet passage formed in the selector valve which communicates with a separate monitoring apparatus, the arrangement being that when the contamination is detected from one group the outputs of the four or more pipes of the group may be individually connected to the passage so that the gas from each pipe may be checked. In this way the duct having the faulty fuel container may be discovered and appropriate steps taken to replace the container. When contamination in one group is discovered the selector valve normally carries on its operation checking the other groups in succession.

The main object of the present invention is to provide a construction of shut-off valve which is simple in operation and manufacture but which, at the same time, provides an extremely good seal in the position where the port in the associated selector valve plate is shut off from the pipes of the group of ducts.

A further object is to provide a construction of shut-off valve which will connect any pipe of the associated group to an output connection whilst allowing the remaining pipes to be connected to the associated port in the selector valve plate.

In accordance with the present invention, a shut-off valve comprises a body, a cylindrical bore having a closed end within the body, a plurality of axially spaced ports in the cylindrical wall of the bore, a plug mounted for rotary movement in the bore, a plurality of axially spaced projections from the plug to engage the wall of the bore and coinciding in number and axial spacing with the ports in the wall of the bore, so that individual ports are engaged by their respective projections from the plug at differing angular positions thereof, each projection, including a port, a first passageway in the body, a rotary fluid connection from the first passageway in the body to all the ports in the projections, a rotary valve plate mounted for rotation with the plug and spring loaded into contact with the closed end of the bore, and a second passageway in the body opening to an eccentric port in the closed end of the bore whereby in one angular position of the plug the valve plate isolates the second passageway from the interior of the bore and in other positions fluid flow may take place between the second passageway and the ports in the cylindrical wall of the bore uncovered by the projections. The ports opening into the cylindrical bore are connected to the pipes from the individual ducts of the group in the reactor whilst the second passageway in the body is connected to the associated port in the selector valve plate to supply gas flow jointly from all pipes in the group. The first passageway in the body communicates with a second monitoring apparatus and for individual positions of the plug each pipe may individually be connected to this passage for individual monitoring of gas from the pipes. The selection of the individual ports leading from the pipes by different angular positions of the plug does not necessarily give a highly efficient seal between the plug and the cooperating port in the cylindrical wall of the bore, but this in itself is of no consequence since there is substantially no pressure differential between the pipes. The means to rotate the plug may comprise a spindle projecting through the open end of the bore, suitable seals being provided around the spindle to prevent any escape of gas from the plug. The end plate of the plug may be provided with further eccentric ports which are arranged to co-operate with the eccentric port in the closed end of the bore at the position where the plug selects individual ports in the cylindrical wall for individual monitoring. In this way the ports in the cylindrical wall not selected still have access to the associated port in the plate of the selector valve and may thus still be selected for monitoring by the selector valve in normal sequence.

In order that the invention may be clearly understood one embodiment thereof will now be described with reference to the accompanying drawings, in which:

Figure 7 is a cross-section on the lines 7—7 of Figure 1; and

Figures 8 and 9 are respectively elevations from each end of the rotary plug which appears in Figure 1.

Figure 1:
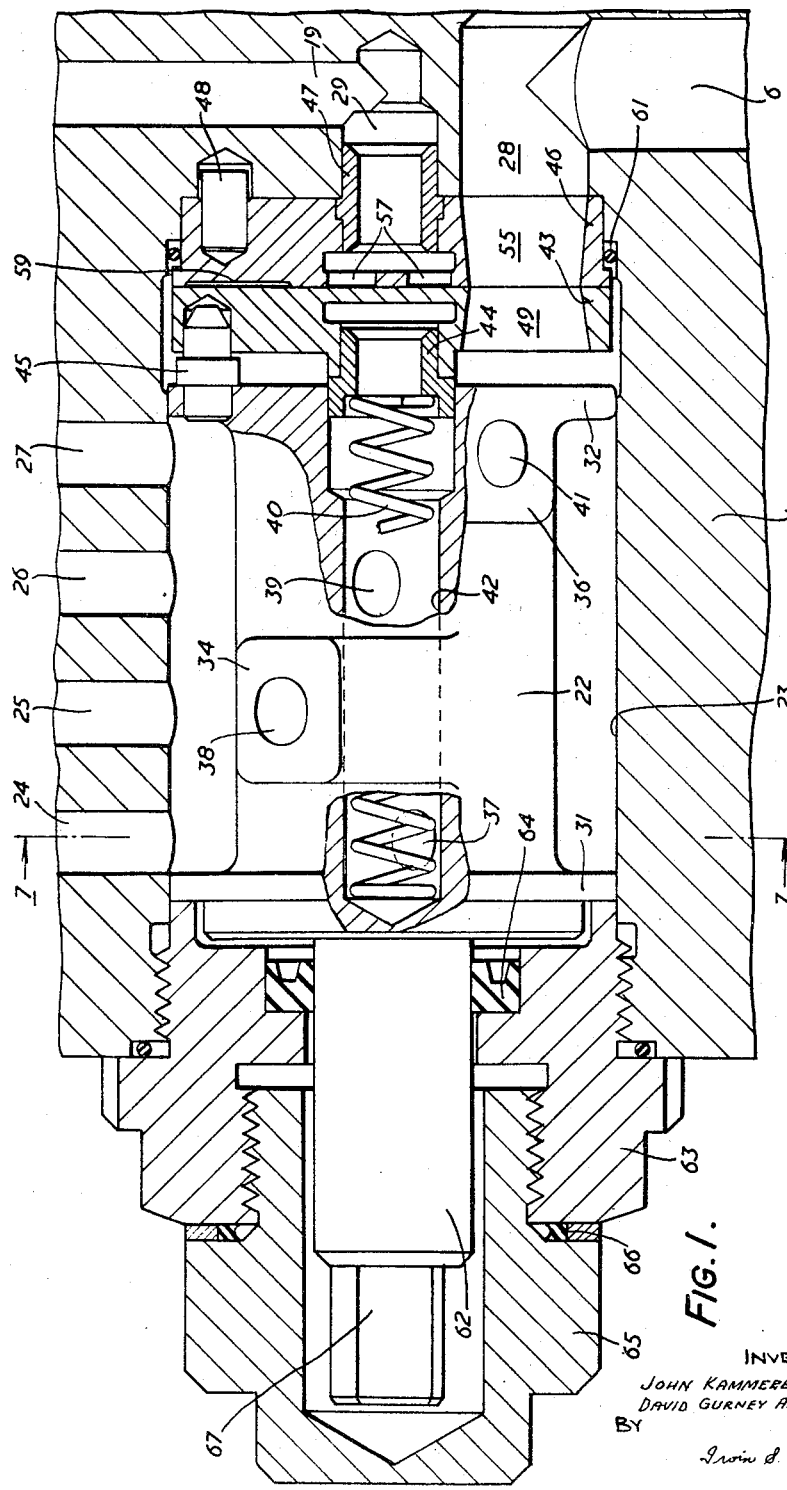
Figure 1 is a detailed cross-section of a shut-off valve.
Figure 2:
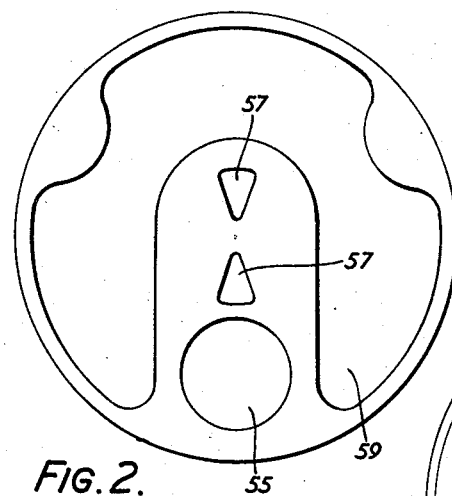
Figures 2 and 3 are front and back elevations respectively of the fixed valve plate which appears in Figure 1.
Figure 3:
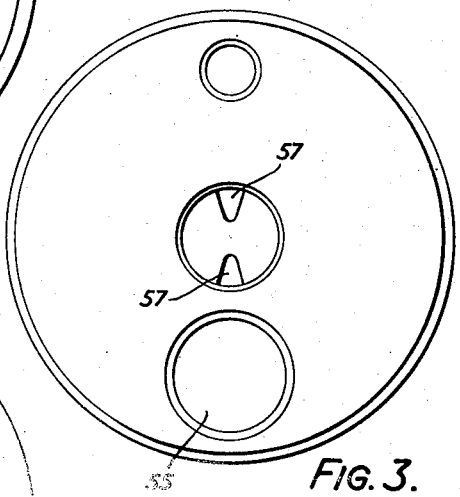
Figure 4:
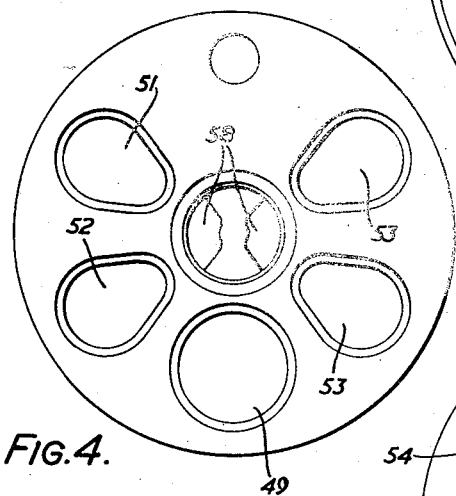
Figures 4 and 5 are front and back elevations respectively of the moving valve plate which appears in Figure 1.
Figure 5:
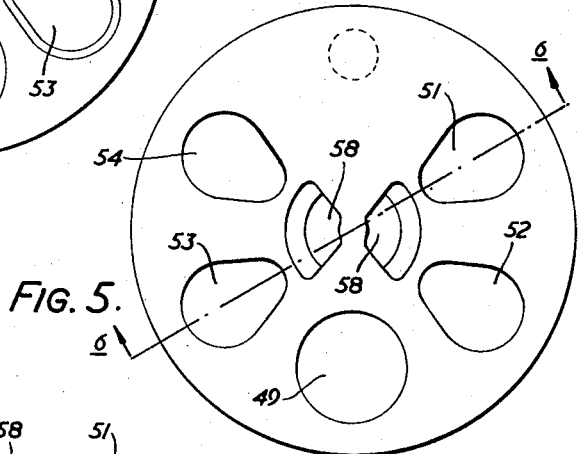
Figure 6:
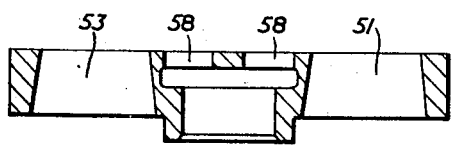
Figure 6 is a cross-section on the line 6—6 of Figure 5.

A typical shut-off valve is illustrated in cross-section in Figure 1 and is basically formed by a rotary plug 22 located within a bore 23 in a body forming part of the selector valve. Into the upper side of the bore 23 four ports 24, 25, 26 and 27 open, these ports being connected to the pipes of the group extending from the reactor and associated with the shut-off valve. The passage 6 extends from a port in the selector valve plate and opens into a port 28 eccentrically disposed in the inner end of the bore. Passage 19 extends from the single outlet passage leading to the separate monitoring apparatus and opens to a port 29 centrally disposed in the inner end of the bore. The rotary plug 22 comprises a spool-like member having two end flanges 31 and 32 for rotary engagement within the bore 23 together with four radial projections 33, 34, 35 and 36, each of which includes a radial extending hole respectively 37, 38, 39 and 41. Each of these holes communicates with an axially extending hole 42 in the plug which opens at the end of the plug formed by flange 32. The outer faces of these projections 33, 34, 35 and 36 are shaped to engage the surface of the bore 23 closely. A moving valve plate 43 shown in detail in Figures 5, 6 and 7 is mounted on the end of plug 22 by means of a central hollow spigot 44 and an eccentric pin 45 whereby the plate may move axially relatively to the plug but is constrained to rotate therewith. A spring 40 located within the hole 42 urges the plate 43 axially away from the plug. A fixed valve plate 46, shown more particularly by Figures 3 and 4 is secured at the inner end of bore 23 by means of a central hollow spigot 47 and an eccentric pin 48. The plate 46 is retained in position by the spring-loaded engagement therewith of the moving plate 43. Five eccentrically disposed ports 49, 51, 52, 53 and 54 are provided in the valve plate 43 at 60° intervals, there being one blank space. These ports co-operate with a single port 55 in the fixed plate 46 which is so located in position that port 55 is always in connection with port 28. The plug 22 is intended for operation at six different angular positions spaced 60° apart and in each of these positions except one, one of the ports 49, 51, 52, 53 or 54 co-operates with port 55. When port 49 co-operates with port 55 all of the projections 33 to 36 are clear of ports 24 to 27 whereby gas from all of these ports may flow around the plug 22 and away through ports 49, 55 and 28 to passage 6. To allow gas flow past the flange 32 the latter is cut away at a number of positions 56 seen more particularly in Figure 9. At the four positions where one of the projections 33, 34, 35 or 36 engages respectively one of the ports 24, 25, 26 or 27 then it will be seen that one of the ports 51, 52, 53 or 54 in the moving valve plate coincides with the port 55 in the fixed valve plate and allows gas flow from the three of the ports 24, 25, 26 and 27 which are unconnected to pass out through passage 6. The one of the ports 24, 25, 26 and 27 which is connected by means of a projection passes its gas flow through the hole in the particular projection to the central hole 42 in the plug whence it passes through the hollow spigot 44, valve plates 43 and 46, hollow spigot 47 to the passage 19. It is desirable that in the two valve positions where the flow from the group of pipes is cut off entirely from passage 6 and where the total flow from the group of pipes passes entirely to passage 6, that the central hole 42 in the plug should be isolated entirely from the passage 19. To a limited extent such a shut-off is accomplished by the fact that in these two mentioned positions the projections 33, 34, 35 and 36 engage and are closed by the bore 23. However, such a seal is not sufficiently positive and means are provided in the two valve plates 43 and 46 to ensure a positive seal on the passage 19 at the two valve positions referred to. This means comprises in the centre of the fixed plate 46 two small diametrically opposed ports 57 which co-operate with a pair of diametrically opposed but considerably larger ports 58 formed in the moving plate 43. These ports are arranged so that for any of the two positions previously mentioned which are 180° apart the ports 58 do not coincide with ports 57. For the four other valve positions where one of the projections 33, 34, 35 and 36 coincides with one of the ports 24, 25, 26 or 27 then the ports 57 coincide with the ports 58 and allow gas flow from hole 42 into the passage 19.

It will be seen that the valve plates 43 and 46 are essential elements in the provision of what needs to be a perfect seal between the ports 24, 25, 26 and 27 and the passages 6 and 19 particularly at the one complete shut-off position where the blank space on valve plate 43 closes the port 55. To ensure such a seal the two plates 43 and 46 are made of stainless steel and their mating faces are finished to an optical flat surface. Since the mating surface of plate 46 is rather large it is relieved at positions where there are no ports by a shallow recess 59 which considerably eases the provision of the optical flat surface. The valve plate 46 is sealed at the inner end of the bore 23 by means of a sealing ring 61 which ensures that no gas can pass around the back of the plates to either of the passages 6 or 19.

The plug 22 is operated by means of a shaft 62 extending through the outer end of bore 23. This shaft passes through a bush 63 secured by screw threads into the outer end of bore 23, this bush enclosing a seal 64 acting against the shaft to prevent leakage of gas past the shaft. The outer end of the bush 63 is screw-threaded to receive a sealing cap 65 which entirely encloses the shaft 62 and is sealed by means of a sealing ring 66 against the end of bush 63. The outer end of shaft 62 is shaped at 67 for engagement by an operating key when the cover 65 is removed. This shaping comprises three flat surfaces 68 and a circular surface 69 so that the operating key may be fitted on the end 67 in one position only. The operator will be fully aware of the six positions to which the key is moved which coincides with positioning of the plug 22 in any of the six operating positions. It would be simple to add to the end of shaft 62 a means for locating accurately the plug 22 in any of the six operating positions and for indicating exactly which position was occupied. However, generally speaking, since the operator will be dealing with a great number of such shut-off valves which are all exactly the same he will be able to locate the valve plug accurately in any desired position without reference to locating means, dials or the like.

We claim as our invention:

1. A shut off valve comprising a body, a cylindrical bore having a closed end within the body, a plurality of axially spaced ports in the cylindrical wall of the bore, a plug mounted for rotary movement in the bore, a plurality of axially spaced projections from the plug to engage the wall of the bore and coinciding in number and axial spacing with the port in the wall of the bore, so that individual ports are engaged by their respective projections from the plug at differing angular positions thereof, each projection including a port, a first passageway in the body, a rotary fluid connection from the first passageway in the body to all the ports in the projections, a rotary valve plate mounted for rotation with the plug and spring loaded into contact with the closed end of the bore, and a second passageway in the body opening to an eccentric port in the closed end of the bore whereby in one angular position of the plug the valve plate isolates the second passageway from the interior of the bore and in other positions fluid flow may take place between the second passageway and the ports in the cylindrical wall of the bore uncovered by the projections.

2. A shut-off valve as claimed in claim 1, wherein the rotary fluid connection comprises an axial passageway in the plug opening to a central port in the valve plate which co-operates with a central port in the closed end of the bore leading to the first passageway in the body.

3. A shut-off valve as claimed in claim 2, wherein the ports in the cylindrical wall of the bore are in a line extending parallel to the bore axis whilst the projections from the plug occupy angular dispositions corresponding to the desired angular plug positions where connection is desired between individual of these ports and the first passageway in the body.

4. A shut-off valve as claimed in claim 3, wherein the plug is in the form of a spool having a pair of end flanges which engage the bore whilst the said projections are located between the flanges and extend to their diameter.

5. A shut-off valve as claimed in claim 4, including a fixed end plate positioned against the closed end of the bore which includes ports co-operating with the first and second passageways.

6. A shut-off valve as claimed in claim 5, wherein the central port in the valve plate and the central port in the fixed end plate are shaped so that the first passageway is isolated from the interior of the bore at the angular plug position where all ports in the cylindrical wall of the bore are connected to the second passageway and at the angular plug position where the second passageway is isolated from the interior of the bore.

7. A shut-off valve as claimed in claim 6 including an operating shaft extending from the plug at the end opposite to the valve plate, a seal engaging said shaft to prevent leakage from the bore, an asymmetric shape on the outer end of the shaft to locate a valve operating key in one position only and a removable cap covering the outer end of the shaft in a sealed manner.

No references cited.